United States Patent [19]

Tanaka

[11] 4,021,997

[45] May 10, 1977

[54] DEVICE FOR CUTTING BRANCHES OR CANES

[75] Inventor: Shigemitsu Tanaka, Ueda, Japan

[73] Assignee: Kabushiki Kaisha Shinko Giken, Ueda, Japan

[22] Filed: Nov. 25, 1975

[21] Appl. No.: 635,057

[30] Foreign Application Priority Data

Nov. 29, 1974 Japan ............... 49-136904

[52] U.S. Cl. ................................................. 56/56
[51] Int. Cl.² ......................................... A01D 45/02
[58] Field of Search ................. 56/233–237, 56/229, 244, 245, 255, 51–98, 119, 101

[56] References Cited

UNITED STATES PATENTS

| 281,460 | 7/1883 | Cook | 56/101 |
|---|---|---|---|
| 823,880 | 6/1906 | Koch | 56/98 |
| 976,823 | 11/1910 | Mollere | 56/63 |
| 1,169,793 | 2/1916 | Fulbright | 56/56 |
| 2,279,183 | 4/1942 | Stimatze | 56/98 |
| 3,144,743 | 8/1964 | Gaunt et al. | 56/59 X |
| 3,462,927 | 8/1969 | Quick | 56/56 |

FOREIGN PATENTS OR APPLICATIONS 157,011   6/1954   Australia ............... 56/56

Primary Examiner—Russell R. Kinsey
Attorney, Agent, or Firm—Weingarten, Maxham & Schurgin

[57] ABSTRACT

A cutting device used for cutting branches or canes which comprises a fixed cutter which is attached to a frame detachably mounted on the side portion of a moving body such as a tractor and is provided with cutting edges being in parallel or oblique with the direction of advancing, and moving guides or rotary cutters having a plurality of pushing members or claws to push said branches or canes toward said cutting edges, and with said cutting device, the cutting operation of branches or canes can be facilitated even when they are thick ones.

3 Claims, 8 Drawing Figures

DEVICE FOR CUTTING BRANCHES OR CANES

BACKGROUND OF THE INVENTION

This invention relates to a movable automatic cutting device which is used for cutting thickly grown branches of trees such as those of mulberry or canes of corns commonly called cornstalks, (hereinafter generally referred to simply as "branches or canes").

As the cutting devices of this kind, those having circular saws or reciprocating knives such as mowers are already known. These prior art machines are very useful for cutting thin branches and standing grasses, however, when they are used for cutting thick branches such as those of a mulberry tree or thick cornstalks, the cut sections are cracked or the bark is peeled off. Further, when the branches or canes are cut with circular saws, the cut sections become rough and the regerminating function of live branches are seriously hindered, therefore in such occasion, the cutting device leaving smooth cut sections are required.

BRIEF SUMMARY OF THE INVENTION

The present invention has been made in view of the above facts, and therefore, the primary object of the present invention is to provide an improved cutting device for eliminating the above-mentioned disadvantages.

Another object of the present invention is to provide an automatic cutting device which is able to cut the branches or canes with much larger capacity and workability irrespective of the thicknesses of them and to produce smooth cut sections.

A further object of the present invention is to provide a cutting device for branches and canes which is provided with a fixed cutter having one or more cutting edges and moving guides spaced from said cutting edges; and characterized in that said moving guides have a plurality of pushing members disposed at regular intervals and said pushing members push the branches or canes toward the cutting edges, slide them along said edges and thereby cutting them with said cutting edges.

Still a further object of the present invention is to provide a cutting device for branches or canes which has a fixed cutter and rotary cutter or cutters. During operation of the cutting device, the standing branches or canes are received in the front portion of said cutters during the advancing, are pushed between the fixed cutter and rotary cutters by the claws attached to said rotary cutters and thereby the branches or canes are effectively cut. According to the cutting device of the present invention, the branches or canes can be effectively forced to the cutting edges as compared with the case in which the cutting edges are simply pushed toward the branches or canes, thus even in the case of very thick branches, the cutting can be carried out without any difficulty. In the modification of the cutting device of the present invention, rollers are provided in front of the fixed cutter, and the branches or canes are prevented from being impaired by the front ends of the cutting edges thus the lengthwise ripping or peeling of bark before the cutting can be prevented.

BRIEF DESCRIPTION OF THE DRAWINGS

In order that the invention may be more fully understood, preferred embodiments and various supplementary features will now be described with reference to the accompanying drawings, in which.

DETAILED DESCRIPTION OF THE INVENTION

Referring now to the accompanying drawings, the present invention will be explained in detail.

Figure 1:
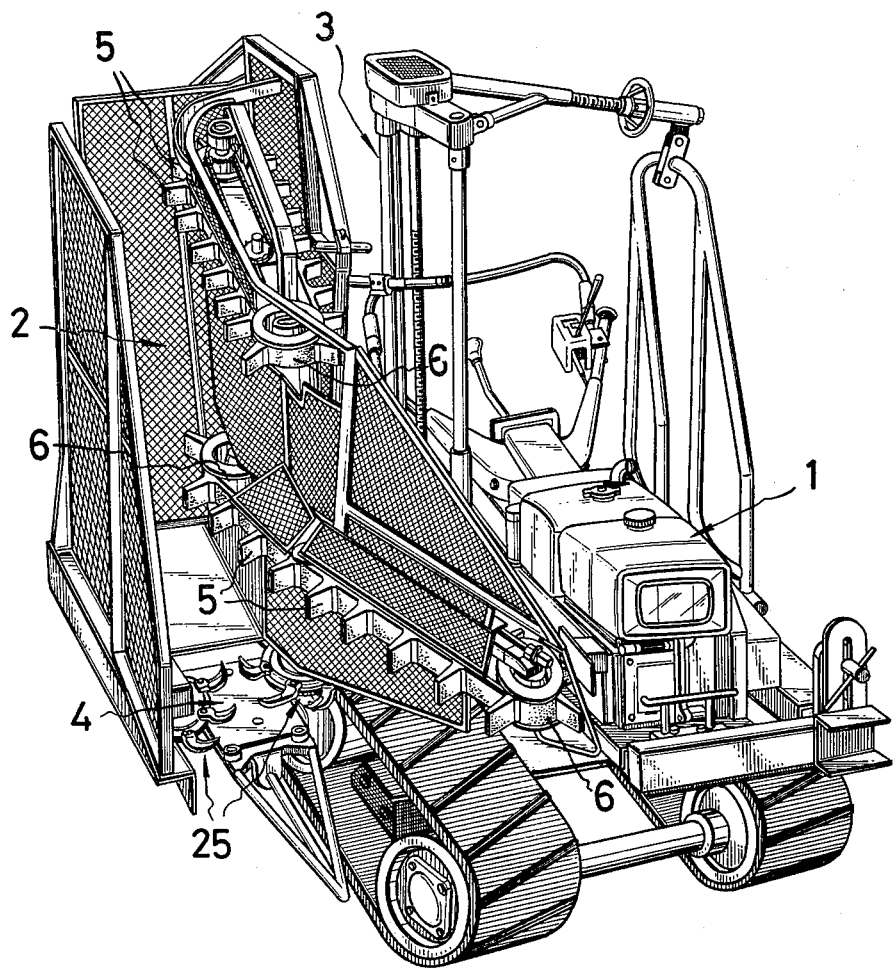
FIG. 1 is a perspective view of a small-sized tractor which is provided with an embodiment of the cutting device of the present invention on the side portion of said tractor.

The motor tractor 1 shown in FIG. 1 is a conventionally used small-sized agricultural tractor which is provided with supporting rods 3 for attaching a vertically movable cutting device 2. The power source for the tractor 1 is also used for the cutting device 2 and the common means such as gearing, chains or their combinations are used as the transmission mechanism.

The above-mentioned cutting device 2 is provided with endless belts 6 having a plurality of claws 5 to gather up standing branches or canes or the like and pass them into a cutter portion 4. In the embodiment shown in FIG. 1, two horizontal rows of endless belts 6 are provided, however, the number of the endless belts 6 may be freely determined according to the scale of the cutting device 2.

Figure 2:
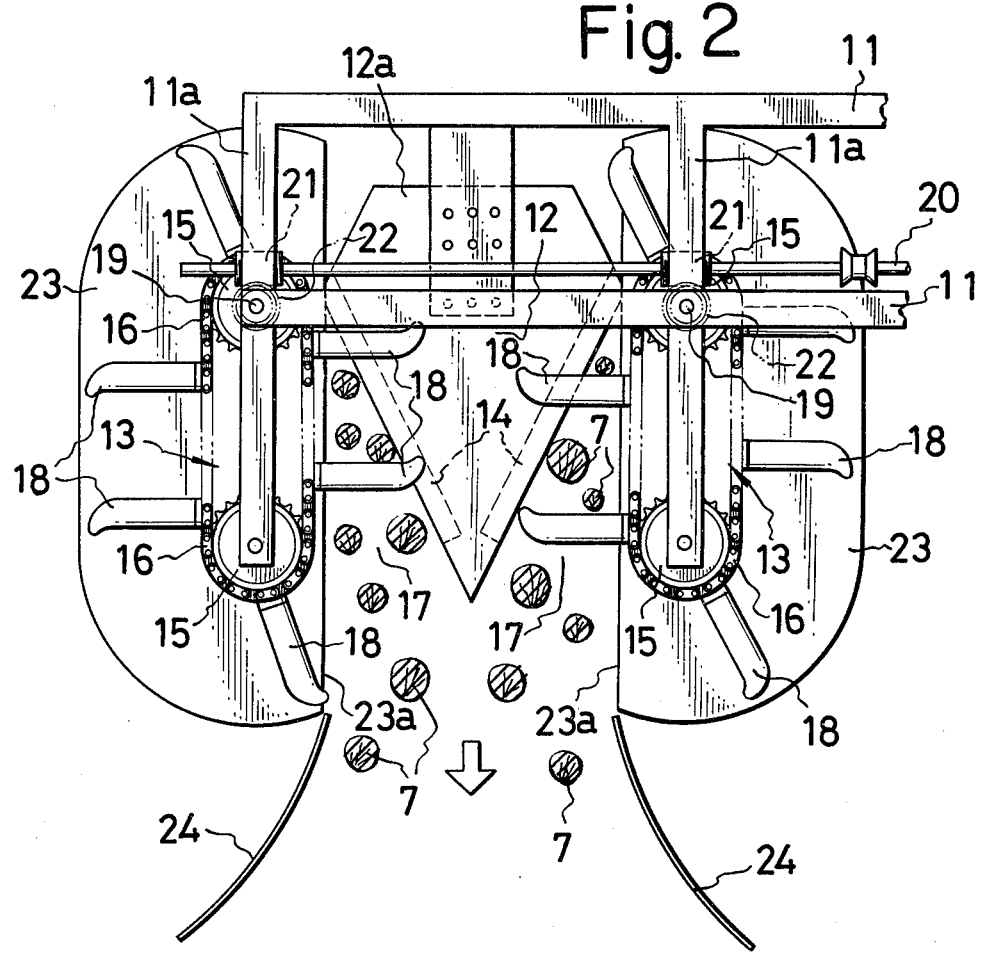
FIG. 2 is a schematic plan view of a cutting device which is provided with circulating pushing members.
Figure 3:
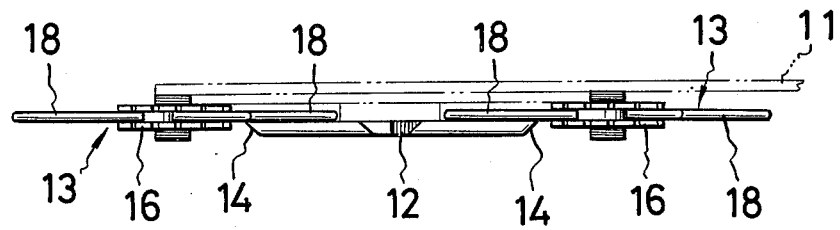
FIG. 3 is a schematic front view of a fixed cutter and the pushing members.

The cutting device 2 shown in FIG. 2 is provided with a single fixed cutter and two moving guides in combination. The numeral 11 indicates a frame mounted on a side of the tractor 1, 12 is a cutter and 13's are moving guides for cutting branches or canes, said devices being disposed on both sides of the cutter 12.

Said cutter 12 is an equilateral triangle having a pointed end and two tapered sides on both sides of said pointed end, and the base portion 12a is firmly attached to the frame 11. Further, said two sides are provided with cutting edges 14. Attached to the horizontal arms 11a of the frame 11 are the above-mentioned moving guides 13, each of which comprises a pair of sprocket wheels 15 and a chain 16 engaging with said sprocket wheels 15. Each chain 16 of these moving guides 13 is provided with a plurality of pushing members 18 attached at regular intervals, and the tip ends of said members 18 are bent in the direction of motion of chain 16. The pushing members 18 are moved horizontally on the edges 14 and the branches or canes 7 coming into the spaces 17 between the cutter 12 and the moving guides 13 are pushed against the edges 14, thus the cutting can be performed. On the rotating shafts 19 of the sprockets 15 near the base portion of the cutter 12, worm wheels 22 are fitted and the worm wheels 22 are caused to engage with the worms 21 on the driving shaft 20. The chains 16 are thereby moved in the direction from the tip end of the cutter 12 toward the base portion 12a.

Both the moving guides 13 have plates 23 therebeneath and the inside edges 23a of the plates 23 in parallel to said chains serve as guides in combination with the collecting plates 24 disposed in the front portion, and the edges 23a prevent the branches 7 from getting into the moving guides 13.

The above-mentioned cutting device is mounted on the side part of a tractor with the frame 11 where the cutter 12 of the cutting device is directed toward the advancing direction. The motive power of the tractor is then transmitted to the driving shafts 19 and thereby the moving guides 13 on both sides of the cutter 12 are driven, where the chain 16 on the right side is moved clockwise and the chain 16 on the left side, counterclockwise. Therefore, with the advancing of the cutting device and the circular motions of the pushing members 18, a large number of branches 7 can be cut continuously. During the advancing of the cutting device, standing branches or canes 7 are guided in the above-mentioned spaces 17 by the collecting plates 24 and they are passed to the inclined cutting edges 14 on both sides of the cutter 12 by the pushing members 18 which are circulated faster than the speed of the advancing. Thus the branches or canes 7 are slid along the cutting edges 14 toward the base portion 12a with the pushing force of the pushing members 18 and the advancing of the cutter 12, and thereby most part of the branches or canes 7 are cut before they reach the base portion 12a of the cutter 12. Especially, when the branches or canes 7 are guided into the spaces 17, they are held between the cutting edges 14 and the pushing members 18, so that the cracks on the cross-sections and the peeling of park are unlikely to occur and the roughness of the cut sections are prevented which is different from the case in which free branches or cane are cut.

Figure 4:
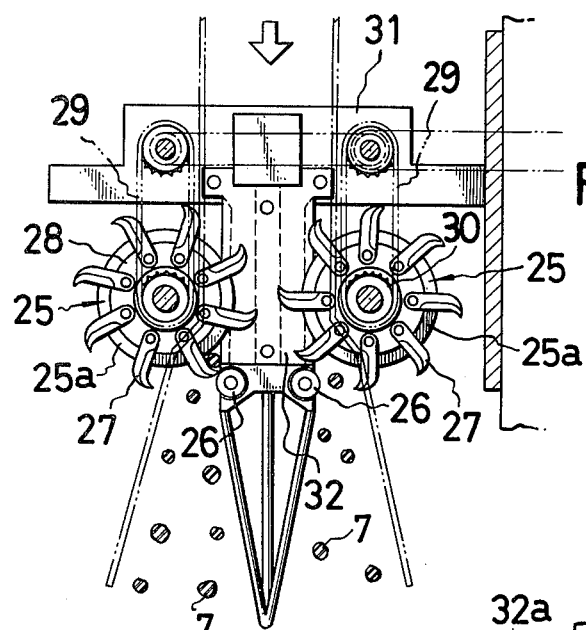
FIG. 4 is a schematic plan view of a cutting device which is provided with a pair of rotary cutters and a fixed cutter.

The cutting device 2 shown in FIG. 4 comprises a combination of a single fixed cutter 32 and a pair of rotary cutter disks 25. Said fixed cutter 32 is provided on both sides with cutting edges 32a (FIG. 5) and the base portion of the fixed cutter 32 is attached to the frame 31 in a manner that the cutting edges 32a are parallel to the advancing direction. Further, in the front portion of said cutting edges 32a, a pair of rollers 26 are horizontally and rotatably fitted where the peripheries of the rollers 26 are somewhat projected from the prolongations of the cutting edges 32a.

The above-mentioned rotary cutter disk 25 comprises a body portion 25b having a cutting edge 25a on the periphery and a support member 28 having a plurality of claws 27 radially disposed around the member 28, and the tip ends of said claws 27 are bent to the direction of motion of said cutting edges 25a to some extent. Said body portion 25b and holding member 28 are integrally put in layers and the claws 27 project outward from the upper portion of said cutting edges 25a.

These rotary cutter disks 25 are pivoted to the frame 31 in the side portions of the fixed cutter 32, and thus claws 27 move on the fixed cutter 32 and the cutting edges 25a and 32a slide on each other.

The rotary shafts of said cutter disks 25 are fixed to chain wheels 30 with which chains 29 are engaged. Thus the power can be supplied from the tractor and in the operation, the cutter disk 25 on the right side is rotated clockwise and that on the left side, counterclockwise through the above-mentioned chained transmission mechanism. Accordingly, a plurality of standing branches or canes 7 are held within the side portion of the fixed cutter 32 and they are continuously cut with the advancing of the tractor and the rotation of the rotary cutter disks 25.

Figure 5:
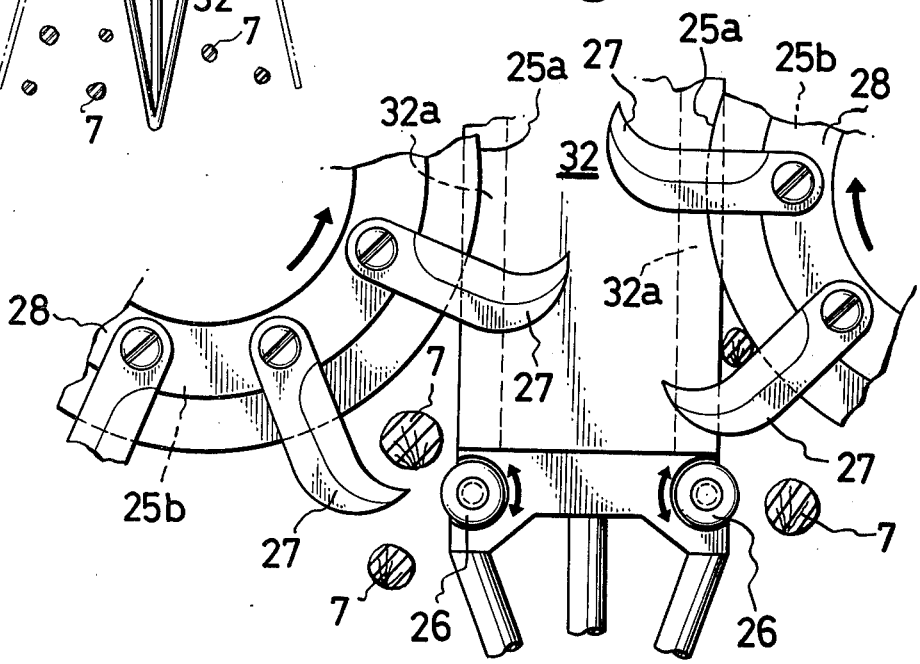
FIG. 5 is an enlarged partial plan view of the cutting portion of the cutting device.
Figure 6:
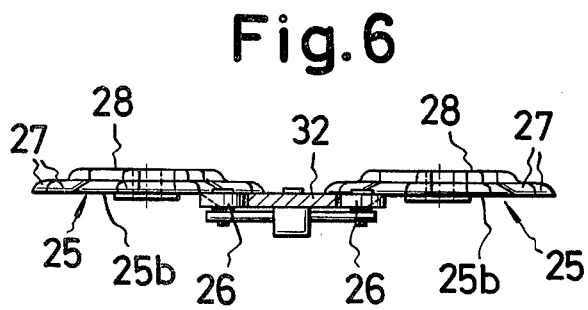
FIG. 6 is a schematic front view of the fixed cutter and the rotary cutters.

As shown in FIGS. 5 and 6, this holding action to the branches or canes 7 are made by the claws 27 of the cutter disks 25 where the branches or canes 7 gathered in the front portion of the cutter 32 by the guiding member are pushed into the spaces between the cutter 32 and the cutter disks 25 and they are put between both cutting edges 32a and 25a. Since the cutting edges 25a are circular in configuration and the grasping of the branches or canes 7 is not caused through the cutting edges 25a rotating in the same direction as the passing of the branches or canes 7, they are liable to slip out, however, the slipping is prevented by the provision of the claws 27, and thus the branches or canes 7 are cut by the cutting edges 25a and 32a, and in addition, by the tip portions of the claws 27.

In this holding and cutting of the branches or canes 7, in the case that they are grasped by the pointed ends of the claws 27, the smushing or peeling of the branches or canes 7 are liable to occur. Therefore, the rollers 26 are provided to the front portions of the cutting edges 32a, thus, with the rotation of the rollers 26, the branches or canes 7 are easily slipped into the edged portions and the cutting operation is facilitated.

Figure 7:
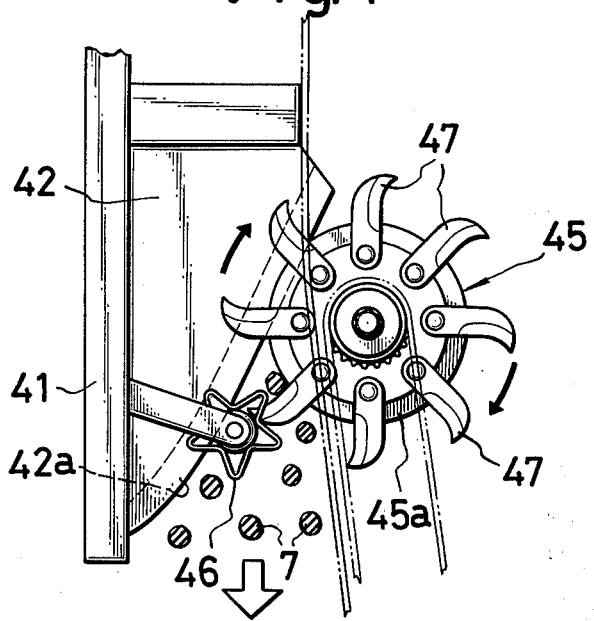
FIG. 7 is a schematic plan view of a cutting device which is provided with a rotary cutter and a fixed cutter.
Figure 8:
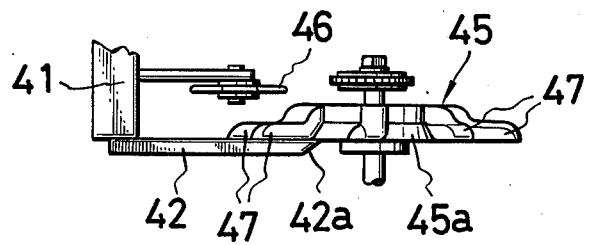
FIG. 8 is a front view of the cutting device shown in FIG. 7.

The cutting device shown in FIG. 7 is provided with the combination of a fixed cutter and a rotary cutter disk. The fixed cutter 42 has an inclined cutting edge 42a on its one side and is mounted on a frame 41. In the forward portion of the cutting edge 42a, there is provided a rotary star-like wheel 46 and the claws 47 attached on the edges 45a of the rotary cutter disk 45 are passed under said wheel 46, said rotary cutter disk 45 being rotatably pivoted to the frame 41. Thereby, the branches or canes 7 are well held into the edged portions and pushed against the cutting edges 42a.

It is to be noted that the specific embodiments described and shown herein are intended as merely illustrative and in no way restrictive of the invention.

What is claimed is:

1. A device for cutting branches and canes, said device comprising:
    a vehicle;
    a frame detachably mounted to said vehicle;
    a fixed cutter having at least one cutting edge mounted to said frame; and
    moving guide means rotatably mounted to said frame adjacent said fixed cutter, said moving guide means comprising:
    at least one rotary cutting disk having a cutting edge on its periphery; and
    a plurality of pushing members radially mounted to said cutting disk;
    wherein said cutting edge of said cutting disk and said pushing members slide along the cutting edge of said fixed cutter thereby cutting the branches and canes forced between said fixed cutter and rotary cutters.

2. The device recited in claim 1 and further comprising at least one roller rotatably mounted to the forward end of said fixed cutter.

3. The device recited in claim 1 and further comprising fixed guide members mounted to the forward end of said device to guide the branches and canes into said fixed and rotary cutters.

* * * * *